US012586263B2

(12) United States Patent
Wang et al.

(10) Patent No.: US 12,586,263 B2
(45) Date of Patent: Mar. 24, 2026

(54) MACHINE LEARNING-BASED GENERATION OF OUTPUTS IN AUGMENTED REALITY ENVIRONMENTS

(71) Applicant: Dell Products L.P., Round Rock, TX (US)

(72) Inventors: Zijia Wang, London (GB); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 18/775,219

(22) Filed: Jul. 17, 2024

(65) Prior Publication Data

US 2026/0024236 A1     Jan. 22, 2026

(51) Int. Cl.
| | |
|---|---|
| *G06T 11/00* | (2026.01) |
| *G06F 40/30* | (2020.01) |
| *G06F 40/40* | (2020.01) |
| *G06N 3/0475* | (2023.01) |
| *G06V 40/16* | (2022.01) |
| *G10L 25/63* | (2013.01) |

(52) U.S. Cl.
CPC .............. G06T 11/00 (2013.01); G06F 40/40 (2020.01); G06N 3/0475 (2023.01); *G06F 40/30* (2020.01); *G06V 40/174* (2022.01); *G10L 25/63* (2013.01)

(58) Field of Classification Search
CPC ........ G06T 11/00; G06F 40/40; G06N 3/0475
See application file for complete search history.

(56) References Cited

U.S. PATENT DOCUMENTS

| | | | |
|---|---|---|---|
| 12,354,500 B1 * | 7/2025 | Fieldman ................ | G06T 11/00 |
| 2023/0065870 A1 * | 3/2023 | Pyzow ..................... | G06N 3/10 |
| 2024/0311693 A1 * | 9/2024 | Smith .................... | G06N 3/045 |
| 2024/0403772 A1 * | 12/2024 | Lafreniere ............. | G06F 3/011 |

OTHER PUBLICATIONS

B. Wang et al., "Enhancing Large Language Model with Self-Controlled Memory Framework," arXiv:2304.13343v2, Feb. 15, 2024, 16 pages.

(Continued)

*Primary Examiner* — Daniel F Hajnik
*Assistant Examiner* — Joshua Jungwook Suo
(74) *Attorney, Agent, or Firm* — Ryan, Mason & Lewis, LLP

(57) ABSTRACT

An apparatus comprises at least one processing device configured to generate, using a first machine learning model, a first data structure comprising input representations of one or more input components from an augmented reality environment. The at least one processing device is also configured to generate, using a second machine learning model that takes as input at least a portion of the first data structure, a second data structure comprising at least one vector representation characterizing relevance of one or more of the input representations in the first data structure. The at least one processing device is further configured to generate, using a third machine learning model that takes as input at least a portion of the first data structure and at least a portion of the second data structure, an output response, and to present the output response to a user in the augmented reality environment.

20 Claims, 6 Drawing Sheets

(56) References Cited

OTHER PUBLICATIONS

Marking-Interactive, "POND's LaunchesAI tool to match people to skincare products," https://www.thedrum.com/news/2019/07/18/pond-s-launches-ai-tool-match-people-skincare-products, Jul. 18, 2019, 8 pages.
A. Latimer, "Estee Lauder and Modiface Launch Lipstick Chatbot," https://www.gcimagazine.com/brands-products/color-cosmetics/news/21854157/estee-lauder-and-modiface-launch-lipstick-chatbot, Jul. 11, 2017, 10 pages.
R. Kumar, "Augmented Reality Chatbots" https://medium.com/zeals-tech-blog/augmented-reality-chatbots-4cbec463af6, Jun. 3, 2022, 22 pages.
S. Roller et al., "Recipes for Building an Open-domain Chatbot" arXiv:2004.13637v2, Apr. 30, 2020, 25 pages.
J. Zhang et al., "PEGASUS: Pre-training with Extracted Gap-sentences for Abstractive Summarization". Proceedings of the 37th International Conference on Machine Learning, Jul. 2020, 12 pages.
C. Raffel et al., "Exploring the Limits of Transfer Learning with a Unified Text-to-Text Transformer," Journal of Machine Learning Research, vol. 21, 67 pages, Jun. 2020.
A. H. Miller et al., "Key-Value Memory Networks for Directly Reading Documents," arXiv:1606.03126v2, Oct. 10, 2016, 10 pages.

* cited by examiner

100

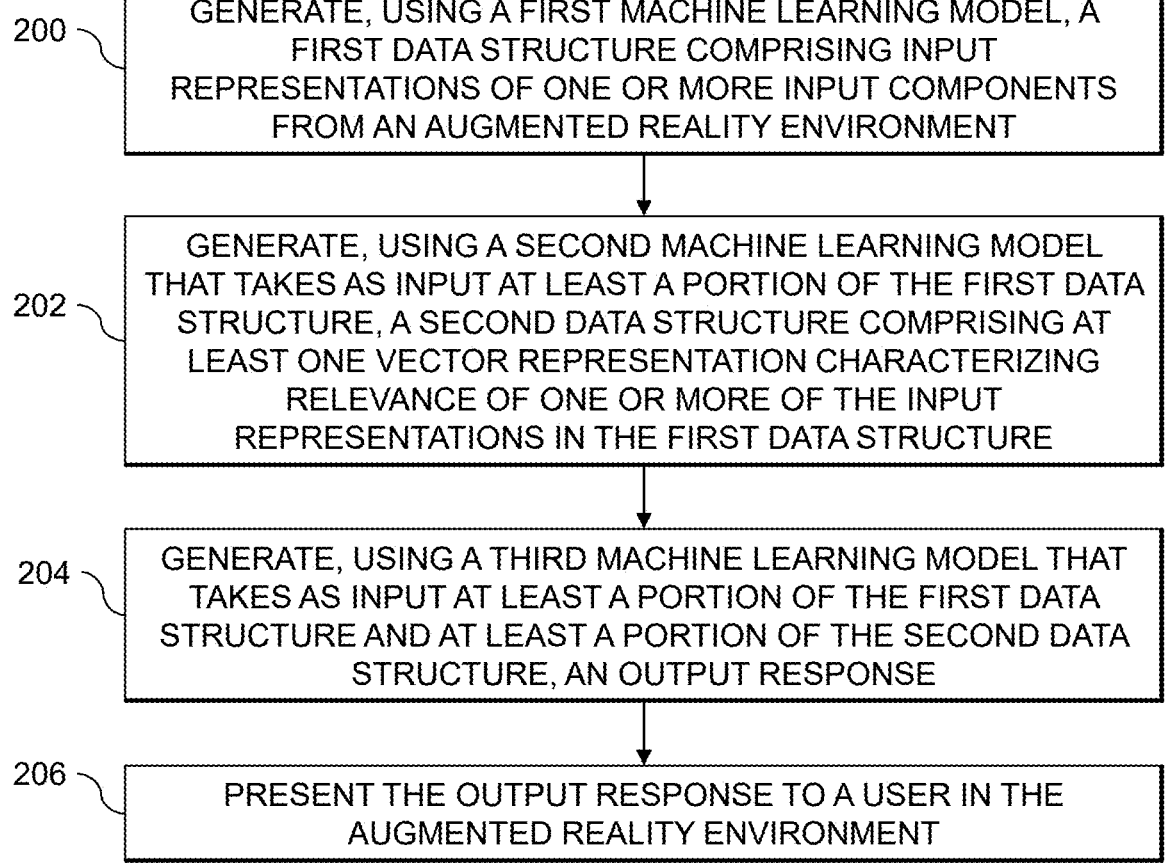

200 — GENERATE, USING A FIRST MACHINE LEARNING MODEL, A FIRST DATA STRUCTURE COMPRISING INPUT REPRESENTATIONS OF ONE OR MORE INPUT COMPONENTS FROM AN AUGMENTED REALITY ENVIRONMENT

202 — GENERATE, USING A SECOND MACHINE LEARNING MODEL THAT TAKES AS INPUT AT LEAST A PORTION OF THE FIRST DATA STRUCTURE, A SECOND DATA STRUCTURE COMPRISING AT LEAST ONE VECTOR REPRESENTATION CHARACTERIZING RELEVANCE OF ONE OR MORE OF THE INPUT REPRESENTATIONS IN THE FIRST DATA STRUCTURE

204 — GENERATE, USING A THIRD MACHINE LEARNING MODEL THAT TAKES AS INPUT AT LEAST A PORTION OF THE FIRST DATA STRUCTURE AND AT LEAST A PORTION OF THE SECOND DATA STRUCTURE, AN OUTPUT RESPONSE

206 — PRESENT THE OUTPUT RESPONSE TO A USER IN THE AUGMENTED REALITY ENVIRONMENT

FIG. 2

MACHINE LEARNING-BASED GENERATION OF OUTPUTS IN AUGMENTED REALITY ENVIRONMENTS

BACKGROUND

Information processing systems may be used to process, compile, store and communicate various types of information. Information processing systems may include a variety of hardware and software components that may be configured to process, store, and communicate information and may include one or more computer systems, data storage systems, and networking systems. Information processing systems may be used to produce augmented reality and virtual reality applications. In augmented reality applications, also referred to as mixed reality applications, a user environment (e.g., a real-world environment) is overlayed with digital content. In virtual reality applications, the user environment is replaced with a simulated environment. Augmented reality applications and virtual reality applications may utilize specialized hardware including projection-based optical systems that display content on a display, such as a head-mounted display (HMD).

SUMMARY

Illustrative embodiments of the present disclosure provide techniques for machine learning-based generation of outputs in augmented reality environments.

In one embodiment, an apparatus comprises at least one processing device comprising a processor coupled to a memory. The at least one processing device is configured to generate, using a first machine learning model, a first data structure comprising input representations of one or more input components from an augmented reality environment. The at least one processing device is also configured to generate, using a second machine learning model that takes as input at least a portion of the first data structure, a second data structure comprising at least one vector representation characterizing relevance of one or more of the input representations in the first data structure. The at least one processing device is further configured to generate, using a third machine learning model that takes as input at least a portion of the first data structure and at least a portion of the second data structure, an output response, and to present the output response to a user in the augmented reality environment.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for machine learning-based generation of outputs in augmented reality environments in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
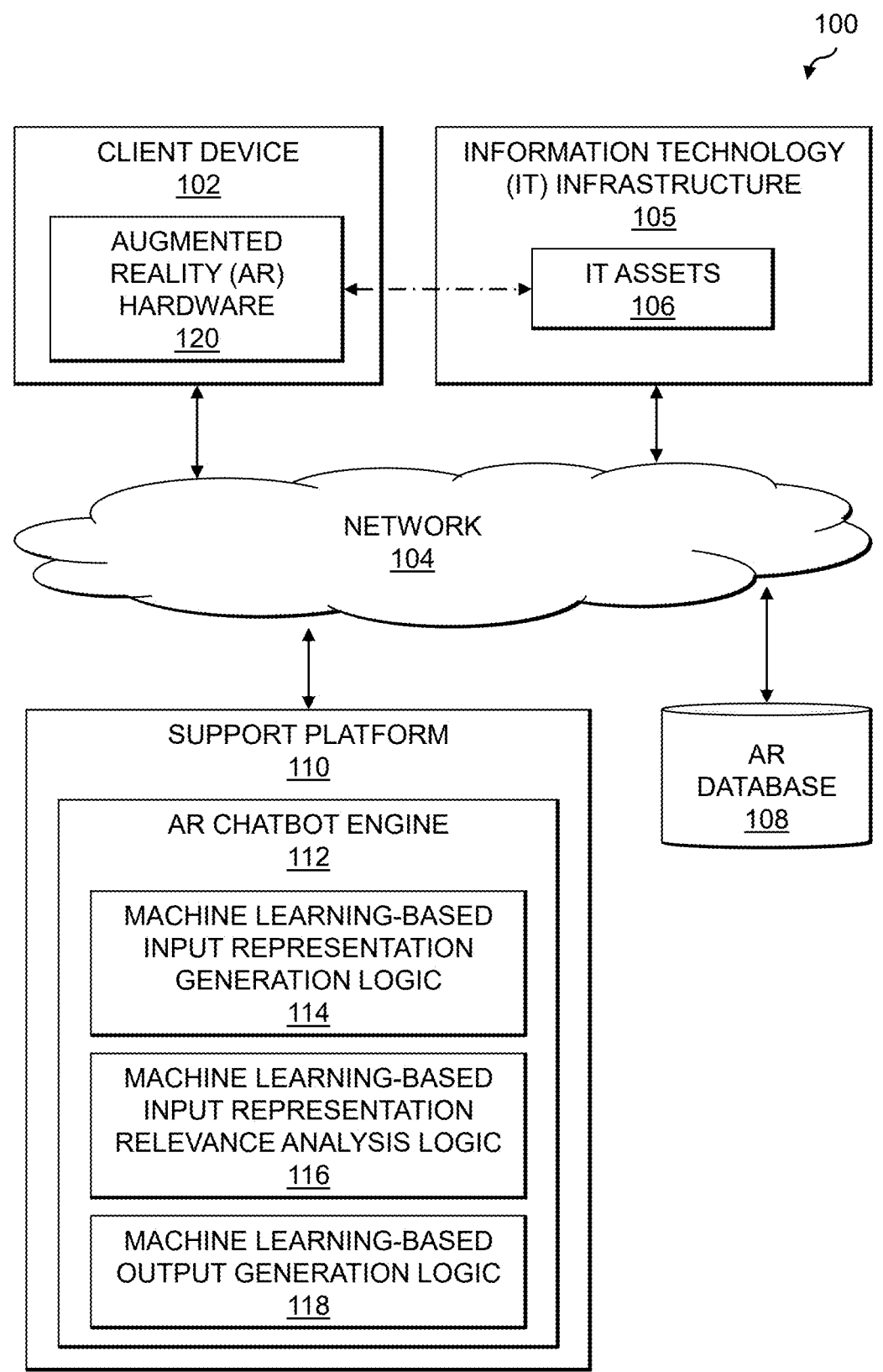
FIG. 1 is a block diagram of an information processing system configured for machine learning-based generation of outputs in augmented reality environments in an illustrative embodiment.

FIG. 1 shows an information processing system 100 configured in accordance with an illustrative embodiment. The information processing system 100 is assumed to be built on at least one processing platform and provides functionality for machine learning-based generation of outputs in augmented reality (AR) environments. The information processing system 100 includes a client device 102 which is coupled to a network 104. Also coupled to the network 104 is an information technology (IT) infrastructure 105 comprising one or more IT assets 106, an AR database 108 and a support platform 110 implementing an AR chatbot engine 112. In some embodiments, the client device 102 is configured to interact with the IT assets 106 as part of an AR environment utilizing AR hardware 120. Such interaction may, for example, include performing servicing of the IT assets 106, utilizing a digital platform (e.g., an application, website, etc.) hosted by the IT assets 106, etc. The IT assets 106 are assumed to comprise physical computing resources in the IT infrastructure 105. The physical computing resource may include physical hardware such as servers, storage systems, networking equipment, Internet of Things (IoT) devices, other types of processing and computing devices including desktops, laptops, tablets, smartphones, etc. The physical computing resource may run one or more virtual computing resources, such as virtual machines (VMs), containers, etc.

In some embodiments, the support platform 110 is used for an enterprise system. For example, an enterprise may subscribe to or otherwise utilize the support platform 110 for managing AR environments operated by users of that enterprise. Users of the enterprise (e.g., support technicians, field engineers or other employees, customers or users which may be associated with client device 102) may utilize an AR environment when interacting with the IT assets 106 or resources thereof. By way of example, a user of the client device 102 may utilize an AR environment when performing servicing of the IT assets 106 (e.g., installing or performing maintenance of the IT assets 106 in the IT infrastructure 105, troubleshooting issues encountered on the IT assets 106, etc.). As another example, the IT assets 106 may host one or more websites or applications which provide interactive AR-based environments utilized by the user of the client device 102. The client device 102, as part of interaction in an AR environment, may communicate information obtained from the AR hardware 120 to the support platform 110, and may receive from the support platform 110 instructions for enhancing the AR environment or the user experience within the AR environment. This may include, for example, leveraging the AR chatbot engine 112 implemented by the support platform 110 in order to enable bidirectional communication or dialog with a user of the client device 102 (e.g., where input from that user is supplied to the AR chatbot engine 112, and the AR chatbot engine 112 provides responses based on such input). As used herein, the term "enterprise system" is intended to be construed broadly to include any group of systems or other computing devices. For example, the IT infrastructure 105 may provide a portion of one or more enterprise systems. A given enterprise system may also or alternatively include one or more client devices including the client device 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client device 102 may comprise, for example, a physical computing device such as an IoT device, a mobile telephone, a laptop computer, a tablet computer, or another type of device utilized by one or more members of an enterprise, in any combination. Such devices are examples of what are more generally referred to herein as "processing devices." Some of these processing devices are also generally referred to herein as "computers." The client device 102 may also comprise virtualized computing resources, such as VMs, containers, etc.

The client device 102 in some embodiments comprises a computer associated with a particular company, organization or other enterprise. Thus, the client device 102 may be considered an example of an asset of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The AR database 108 is configured to store and record various information that is utilized by the support platform 110 in implementing the AR chatbot engine 112. Such information may include, for example, machine learning models (e.g., large language models (LLMs) which are leveraged in analyzing user input and generating responses thereto, historical interactions between users and the AR chatbot engine 112, feedback related to responses generated by the AR chatbot engine 112, AR context information associated with user input to and responses generated by the AR chatbot engine 112, etc. The AR database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

In some embodiments, the client device 102 is assumed to be associated with a system administrator, IT manager or other authorized personnel responsible for managing the IT assets 106 of the IT infrastructure 105. For example, the client device 102 may be operated by a user to perform servicing of the IT assets 106, where such servicing is assisted or facilitated by leveraging AR hardware 120 of the client device 102. In other embodiments, the client device 102 is assumed to be associated with a user that interacts with an AR environment that is at least in part generated utilizing the IT assets 106 (e.g., a website, application or other type of interface implementing an AR environment). Such interaction with the AR environment is facilitated by leveraging the AR hardware 120 of the client device 102. The AR hardware 120, for example, may include one or more cameras or other sensors which is used to capture information associated with an AR environment, and a display or other output device (e.g., one or more speakers, haptic feedback device, etc.) which outputs information within the AR environment. The AR environment, in some embodiments, includes, is part of, or is utilized in conjunction with a virtual reality (VR) environment. In such embodiments, the AR hardware 120 may include VR hardware.

In some embodiments, the IT assets 106 of the IT infrastructure 105 are owned or operated by the same enterprise that operates the support platform 110 (e.g., where an enterprise such as a business provides support for the assets it operates). In other embodiments, the IT assets 106 of the IT infrastructure 105 may be owned or operated by one or more enterprises different than the enterprise which operates the support platform 110 (e.g., a first enterprise provides support for assets that are owned by multiple different customers, business, etc.). Various other examples are possible.

In some embodiments, the client device 102 and the IT assets 106 of the IT infrastructure 105 implement host agents that are configured for exchanging information with one another and possibly the support platform 110. Such information may be related to AR environments which are generated by the IT assets 106 and interacted with by the user of the client device 102, a status or state of the IT assets 106, identifying information for the IT assets 106, servicing actions which have or are to be performed on the IT assets 106, etc. It should be noted that a "host agent" as this term is generally used herein may comprise an automated entity, such as a software entity running on a processing device. Accordingly, a host agent need not be a human entity.

The client device 102, the IT assets 106 and the support platform 110 in the FIG. 1 embodiment are each assumed to be implemented using at least one processing device. Each such processing device generally comprises at least one processor and an associated memory, and implements one or more functional modules or logic for controlling certain features of the client device 102, the IT assets 106 and the support platform 110. In the FIG. 1 embodiment, the support platform 110 implements the AR chatbot engine 112, which comprises machine learning-based input representation generation logic 114, machine learning-based input representation relevance analysis logic 116, and machine learning-based output generation logic 118. The machine learning-based input representation generation logic 114 is configured to use a first machine learning model to generate a first data structure comprising input representations of one or more input components from an AR environment. The machine learning-based input representation relevance analysis logic 116 is configured to use a second machine learning model, that takes as input at least a portion of the first data structure, to generate a second data structure comprising at least one vector representation characterizing relevance of one or more of the input representations in the first data structure. The machine learning-based output generation logic 118 is configured to use a third machine learning model, that takes as input at least a portion of the first data structure and at least a portion of the second data structure, to generate an output response and present the output response to a user in the AR environment. In some embodiments, the first, second and third machine learning models comprise different machine learning models. In other embodiments, two or more of the first, second and third machine learning models comprise the same machine learning model. By way of example, both the first and third machine learning models may comprise one or more large language models (LLMs).

At least portions of the AR chatbot engine 112, the machine learning-based input representation generation logic 114, the machine learning-based input representation relevance analysis logic 116 and the machine learning-based output generation logic 118 may be implemented at least in part in the form of software that is stored in memory and executed by a processor.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client device 102, the IT infrastructure 105, the IT assets 106, the AR database 108 and the support platform 110 or components thereof (e.g., the AR chatbot engine 112, the machine learning-based input representation generation logic 114, the machine learning-based input representation relevance analysis logic 116 and the machine learning-based output generation logic 118) may be implemented on respective distinct processing platforms, although numerous other arrangements are possible. For example, in some embodiments at least portions of the support platform 110 and one or more of the client device 102, the IT infrastructure 105, the IT assets 106 and/or the AR database 108 are implemented on the same processing platform. The client device 102 can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client device 102, the IT infrastructure 105, the IT assets 106, the AR database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 5 and 6.

It is to be appreciated that these and other features of illustrative embodiments are presented by way of example only, and should not be construed as limiting in any way.

It is to be understood that the particular set of elements shown in FIG. 1 for machine learning-based generation of outputs in AR environments is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based generation of outputs in AR environments will now be described in more detail with reference to the flow diagram of FIG. 2. It is to be understood that this particular process is only an example, and that additional or alternative processes for machine learning-based generation of outputs in AR environments may be used in other embodiments.

In this embodiment, the process includes steps 200 through 206. These steps are assumed to be performed by the support platform 110 utilizing the AR chatbot engine 112, the machine learning-based input representation generation logic 114, the machine learning-based input representation relevance analysis logic 116 and the machine learning-based output generation logic 118. The process begins with step 200, generating, using a first machine learning model, a first data structure comprising input representations of one or more input components from an AR environment. The one or more input components may comprise: (i) a user prompt received from the user in the AR environment, (ii) a history of interactions associated with the user in the AR environment, and (iii) visual and spatial information associated with the user in the AR environment. The first machine learning model used to generate the first data structure may comprise one or more LLMs. The one or more LLMs may comprise: at least a first text-based LLM configured for generating input representations of the (i) the user prompt received from the user in the AR environment and (ii) the history of interactions associated with the user in the AR environment; and at least a second vision-based LLM configured for generating input representations of (iii) the visual and spatial information associated with the user in the AR environment.

In step 202, a second data structure is generated using a second machine learning model that takes as input at least a portion of the first data structure. The second data structure comprises at least one vector representation characterizing relevance of one or more of the input representations in the first data structure. The second machine learning model may comprise a Continuous Attention Memory Model (CAMM). The CAMM may comprise: a continuous attention mechanism configured to compute attention weights between the input representations of the first data structure and a query vector; a dynamic memory bank configured to store and update information from the input representations of the first data structure as memory items, each of the memory items comprising a vector representation encoding information from at least one of the input representations of the first data structure; and a context relevance estimator configured to rank the memory items according to a relevance to a current context of the AR environment. The query vector may be initialized randomly and updated iteratively utilizing a gradient descent algorithm. The continuous attention mechanism may be configured to utilize a dot product to compute the attention weights and a sigmoid function. The dynamic memory bank may comprise a set of memory slots, each of the memory slots comprising at least one of the memory items, the dynamic memory bank having a fixed size of memory items and being configured to store the memory items in a chronological order utilizing a first-in, first-out policy for replacing memory items. The context relevance estimator may comprise a feed-forward neural network configured to compute relevance scores for the memory items in the dynamic memory bank.

In step 204, an output response is generated using a third machine learning model that takes as input at least a portion of the first data structure and at least a portion of the second data structure. The third machine learning model may comprise one or more LLMs conditioned on said at least a portion of the second data structure. The one or more LLMs may further incorporate visual and spatial information from the AR environment for customizing the output response based at least in part on a view of the user in the AR environment.

In step 206, the output response is presented to a user in the AR environment. The FIG. 2 process may further include updating at least one of the first machine learning model, the second machine learning model and the third machine learning model according to one or more user preferences of the user in the AR environment. The one or more user preferences of the user in the AR environment may be determined based at least in part on at least one of: sentiment analysis extracting emotions from text or speech of the user captured in the AR environment; facial expression recognition to detect emotions from one or more images of the user captured in the AR environment; and reinforcement learning to learn from rewards or penalties determined from user interaction in the AR environment.

It should be noted that the term "data structure" as used herein is intended to be broadly construed. A data structure, such as any single one of or combination of the first and second data structures referred to above, may provide a portion of a larger data structure, or any one of or combination of the first and second data structures may be combinations of multiple smaller data structures. Therefore, the first and second data structures referred to above may be different parts of a same overall data structure, or one or more of the first and second data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model. It should further be appreciated that "generating" a data structure may encompass, for example, populating a previously-created data structure.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Augmented reality (AR) is a technology that enhances the real world with digital information and media. AR chatbots are virtual agents that can communicate with users in natural language within an AR environment. Creating AR chatbots, however, poses several technical challenges related to processing large and diverse input texts, generating coherent and relevant responses, and incorporating visual and spatial cues from the AR context. Illustrative embodiments provide technical solutions that leverage a Continuous Attention Memory Model (CAMM) to address these and other technical challenges. Inspired by a Self-Controlled Memory (SCM) system, CAMM is a memory-augmented model that enables large-scale language models (e.g., Large Language Models (LLMs)) to process infinite-length inputs by using a continuous attention mechanism, a dynamic memory bank, and a context relevance estimator. CAMM can improve LLMs' performance in tasks such as multi-turn dialog, document summarization, question answering, and more. In some embodiments, CAMM is integrated with an existing LLM, without modification or fine-tuning of the LLM, to create an AR chatbot engine. The technical solutions described herein thus enable LLMs to process infinite-length inputs by using a continuous attention mechanism, a dynamic memory bank, and a context relevance estimator. The technical solutions described herein apply CAMM to create an AR chatbot engine, a system that leverages LLMs to generate realistic and engaging responses for various scenarios and domains in an AR environment. The technical solutions described herein are thus able to incorporate visual and spatial information from the AR context into the input and output of the AR chatbot engine, enhancing the relevance and coherence of the responses. Further, the technical solutions described herein provide a user feedback mechanism that allows the AR chatbot engine to adapt to different user preferences and provide personalized and satisfying experiences.

As discussed above, AR chatbots are virtual agents that can communicate with users in natural language within an AR environment. AR chatbots can provide various benefits for users, such as enhancing user engagement, personalizing product recommendations, and facilitating immersive shopping experiences. AR chatbots may be used in various different domains and scenarios. For example, an artificial intelligence (AI)-enabled skin-diagnostic chatbot may leverage AR and skin diagnostic technologies to help consumers solve skincare problems and recommend products. Further, AR chatbots may be used to allow users to try on products (e.g., makeup such as lipstick shades) and receive personalized recommendations. AR chatbots may also be used in e-commerce, education, entertainment and other use cases. Conventional AR chatbots, however, typically rely on predefined scripts or templates to generate responses, which limits their flexibility and naturalness. Moreover, conventional AR chatbots do not take into account the visual and spatial information from the AR context, which reduces their relevance and coherence. The technical solutions described herein overcome these and other technical challenges enabling the creation of realistic and engaging AR chatbots that leverage large-scale language models (e.g., LLMs) and incorporate AR context into the input and output.

Large-scale language models, such as LLMs, are neural network models that are trained on massive amounts of text data and can generate natural language responses for various tasks and domains. LLMs have shown impressive performance in tasks such as multi-turn dialog, document summarization, question answering, and more. However, LLMs also face several technical challenges, such as in processing large and diverse input texts, retaining long-term information, and estimating context relevance. To address these and other technical challenges, memory-augmented models may be used to enhance LLMs with external memory mechanisms. For example, an SCM system enables LLMs to process infinite-length inputs by using a self-attention mechanism, a memory controller, and a memory scorer. As another example, a key-value memory neural network (KV-MemNN) may be used to enable LLMs to access factual knowledge from external sources by using a key-value retrieval mechanism.

In some embodiments, CAMM (a continuous attention memory model) is used to enable LLMs to process infinite-length inputs by using a continuous attention mechanism, a dynamic memory bank and a context relevance estimator. CAMM is different than conventional approaches such as SCM in several aspects. For example, CAMM uses a continuous attention mechanism that can handle variable-length inputs without padding or truncation, CAMM uses a dynamic memory bank that can store and update relevant information from the input, and CAMM uses a context relevance estimator that can rank the memory items according to their relevance to the current context. CAMM is also different than conventional approaches such as KV-MemNN, in that CAMM does not rely on predefined key-value pairs or external knowledge sources, but rather learns from the input text itself. The technical solutions described herein advantageously integrate CAMM with existing LLMs (e.g., without modification or fine-tuning of the LLMs) to create an AR chatbot engine, a system that leverages the LLMs to generate realistic and engaging responses for various scenarios and domains in an AR environment.

Creating AR chatbots poses several technical challenges, including technical challenges related to processing large and diverse input texts, generating coherent and relevant responses, and incorporating visual and spatial cues from an AR context. AR chatbots need to handle various types of input, such as user utterances, dialog history, product descriptions, reviews, etc. These inputs can be long and complex, and thus may exceed the capacity of LLMs. Moreover, these inputs can come from different sources and domains which may introduce noise and inconsistency. AR chatbots also need to produce natural language responses that are coherent with the previous dialog and relevant to the current context. This requires AR chatbots to retain long-term information, capture semantic and pragmatic relations, and estimate context relevance. AR chatbots further need to take into account the visual and spatial information from the AR environment, such as the user's location, orientation, gesture, facial expression, etc. This information can provide useful clues for understanding the user's intention, emotion and feedback. Moreover, AR chatbots need to generate responses that are consistent and compatible with the AR context, such as providing directions, suggestions, or explanations based on the user's view. To address these and other technical challenges, the technical solutions described herein leverage CAMM to enhance LLMs with external memory mechanisms. CAMM advantageously improves the LLMs' performance in tasks such as multi-turn dialog, document summarization, question answering, etc. In some embodiments, CAMM is integrated with one or more existing LLMs, without otherwise requiring modification or fine-tuning of the existing LLMs, to create an AR chatbot engine. In some embodiments, the use of CAMM can directly address technical challenges associated with current and existing LLMs, including the inability to handle context over long spans of time. CAMM utilizes a continuous attention mechanism, which allows the model to handle infinite-length inputs by dynamically assigning attention to different parts of the input based on their relevance. The dynamic memory bank of the CAMM model stores context information from the past, and uses it to aid in future responses. The context relevance estimator of the CAMM model further assists the model in determining the relevance of different parts of the input, thus helping the model to maintain a coherent and relevant dialog even over long periods.

Figure 3:
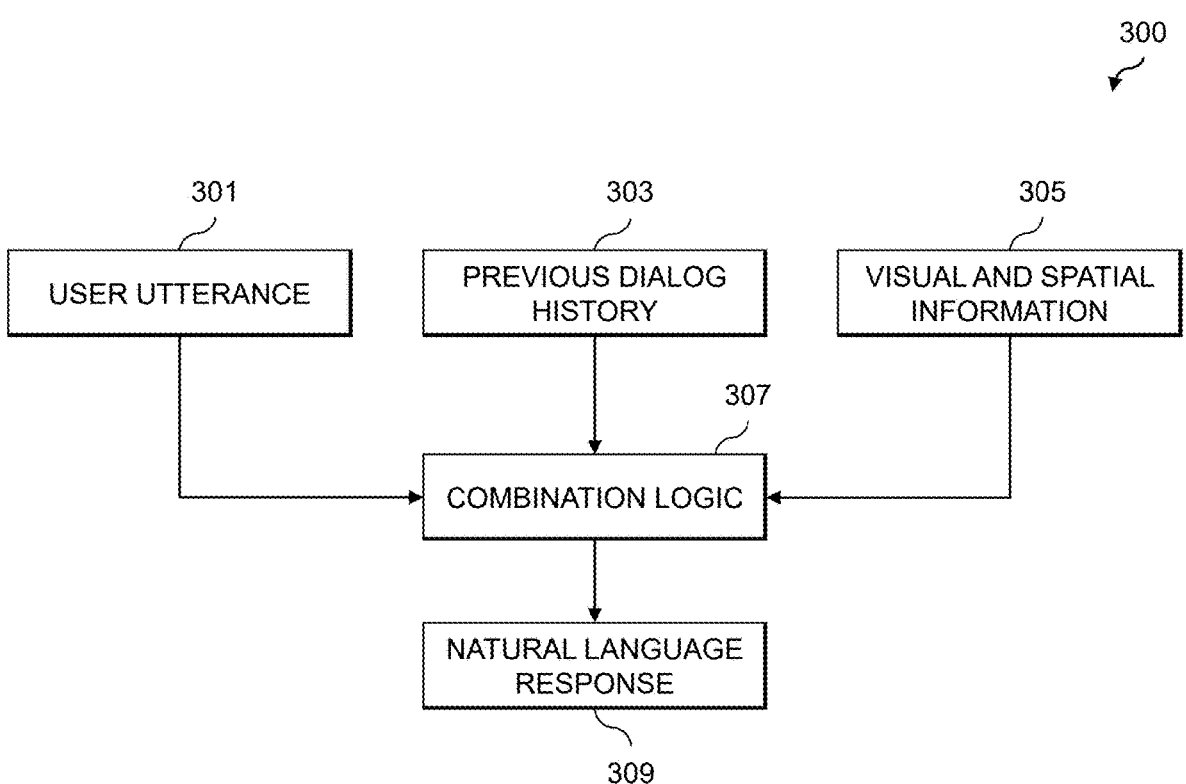
FIG. 3 shows inputs from an augmented reality environment which are combined in an augmented reality chatbot engine for generating a natural language response in an illustrative embodiment.

FIG. 3 shows a system flow 300 for operating an AR chatbot engine. In the system flow 300, inputs include a user utterance 301, previous dialog history 303 and visual and spatial information from the AR context 305. In block 307 combination logic is applied to the inputs 301, 303 and 305, which produces an output natural language response in block 309. The output natural language response produced in block 309 is a natural language response that is relevant to and coherent with the inputs 301, 303 and 305.

Figure 4:
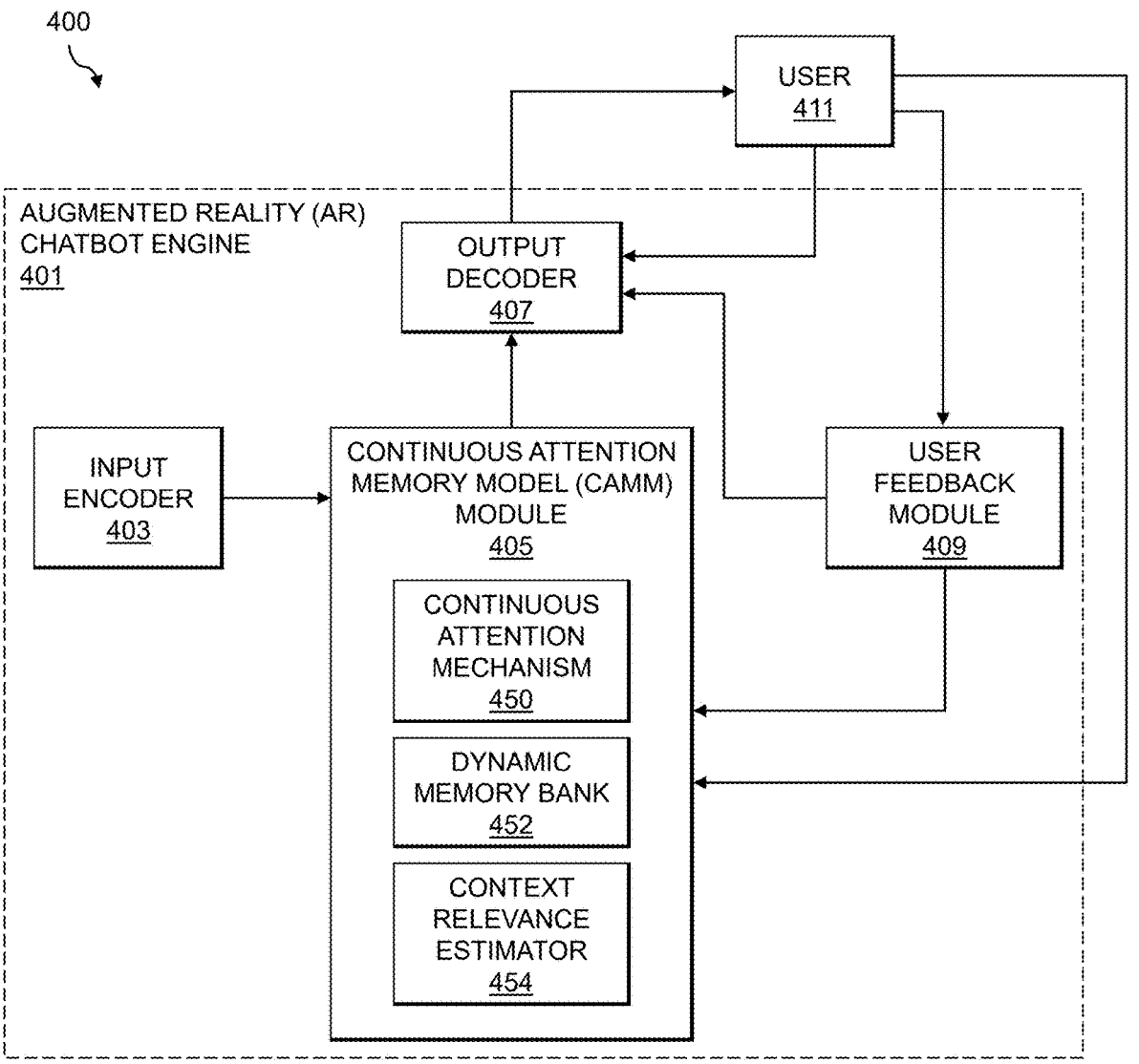
FIG. 4 shows an augmented reality chatbot engine configured for machine learning-based generation of outputs in an illustrative embodiment.

FIG. 4 shows a system 400 including an AR chatbot engine 401 comprising an input encoder 403, a CAMM module 405, and output decoder 407, and a user feedback module 409. The input encoder 403 is configured to encode the input components (inputs 301, 303 and 305 in the system flow 300) into vector representations using LLMs. The CAMM module 405 is configured to process the input representations using a continuous attention mechanism 450, a dynamic memory bank 452, and a context relevance estimator 454. The CAMM module 405 is configured to output a vector representation that summarizes the most relevant information from the input. The output decoder 407 generates a natural language response using LLMs conditioned on the output of the CAMM module 405 The output decoder 407 may further incorporate visual and spatial information from the AR context into the response. The user feedback module 409 collects and analyzes user feedback (e.g., explicit or implicit) from a user 411 (e.g., ratings, comments, emotions, etc.) and uses it to update the CAMM module 405 and the output decoder 407. The user feedback module 409 aims to adapt to different user preferences to provide personalized and satisfying experiences. The input encoder 403, the CAMM module 405, the output decoder 407 and the user feedback module 409 are interconnected and work together to create the AR chatbot engine 401, where the input encoder 403 provides the input representations to the CAMM module 405, the CAMM module 405 provides the output representation to the output decoder 407, and the output decoder 407 provides the response to the user 411. The user feedback module 409 provides feedback to the CAMM module 405 and the output decoder 407, with this feedback loop enabling the AR chatbot engine 401 to learn from the behavior of the user 411 and improve over time.

The input encoder 403 encodes input components into vector representations using LLMs. The input components may include the user utterance (e.g., a natural language query or command from the user 411), the previous dialog history (e.g., the sequence of previous utterances and responses between the user 411 and the AR chatbot engine 401), and the visual and spatial information from the AR context (e.g., the images, video or other media that capture the view of the user 411 and the location of the user 411 in the AR environment). The input encoder 403 may use different LLMs for different input components. For example, a text-based LLM (e.g., a Bidirectional Encoder Representation from Transformers (BERT) model, a Generative Pre-trained Transformer-3 (GPT-3) model, etc.) may be used for the user utterance and the dialog history, and a vision-based LLM (e.g., a Contrastive Language-Image Pretraining (CLIP) model, a text-to-image model such as a DALL-E model, etc.) may be used for the visual and spatial information. The input encoder 403 outputs a set of vector representations for each input component.

The CAMM module 405 processes the input representations from the input encoder 403 using the continuous attention mechanism 450, the dynamic memory bank 452, and the context relevance estimator. The CAMM module 405 outputs a vector representation that summarizes the most relevant information from the input representations. The continuous attention mechanism 450 computes attention weights between each input representation and a query vector. The query vector is initialized randomly and updated iteratively by a gradient descent algorithm. The continuous attention mechanism 450 is configured to handle variable-length inputs without padding or truncation. The continuous attention mechanism 450 is different from a conventional self-attention mechanism in several aspects. For example, the continuous attention mechanism 450 does not require a fixed-length input sequence, does not use a softmax function to normalize the attention weights, and does not use a multi-head mechanism to compute multiple attention weights. The continuous attention mechanism 450 instead uses a dot product to compute the attention weights and a sigmoid function to bound them between 0 and 1. The continuous attention mechanism 450 can be formulated as:

$$a_t = \sigma(q_t X_t) \in \mathbb{R}^{n_t}$$

where $q_t \in \mathbb{R}^d$ is the query vector at iteration t, $X_t \in \mathbb{R}^{n_t \times d}$ is the input matrix at iteration t, $n_t$ is the number of input representations at iteration t, $\sigma$ is the sigmoid function, and $a_t \in \mathbb{R}^{n_t}$ is the attention vector at iteration t.

The query vector is updated by a gradient descent algorithm that minimizes the following objective function:

$$L_t = -\log(a_t, y_t)$$

where $y_t \in \mathbb{R}^{n_t}$ is the target vector at iteration t, which indicates the desired attention weight for each input representation. The target vector can be defined by different criteria, such as relevance, recency, frequency, etc. The query vector is updated as follows:

$$q_{t+1} = q_t - \alpha_t \nabla_{q_t} L_t$$

where $\alpha_t$ is the learning rate at iteration t, and $\nabla_{q_t} L_t$ is the gradient of the objective function with respect to the query vector at iteration t.

The dynamic memory bank 452 stores and updates relevant information from the input representations. The dynamic memory bank 452 includes a set of memory slots, each containing a memory item, where a memory item is a vector representation that encodes some information from the input. The dynamic memory bank 452 may have a fixed size, and may use a First-In First-Out (FIFO) policy to replace the oldest memory item with a new one when it is full. The dynamic memory bank 452 is different from a conventional static memory bank in several aspects. The dynamic memory bank 452, for example, does not require predefined key-value pairs or external knowledge sources. The dynamic memory bank 452 also does not use a retrieval mechanism to access the memory items, and does not use an update mechanism to modify the memory items. Instead, the dynamic memory bank 452 uses the input representations as the memory items and stores them in chronological order. The dynamic memory bank 452 can be formulated as:

$$M_t = [x_t - m + 1, \dots, x_{t-1}, x_t] \in \mathbb{R}^{m \times d}$$

where $x_i \in \mathbb{R}^d$ is the input representation at time step i, m is the size of the dynamic memory bank 452, and $M_t \in \mathbb{R}^{m \times d}$ is the memory matrix at iteration t.

The context relevance estimator 454 ranks the memory items according to their relevance to the current context. The context relevance estimator 454 may be implemented as a neural network that takes as input the query vector and a memory item, and outputs a scalar score. The higher the score, the more relevant the memory item is to the current context. The context relevance estimator 454 is different from conventional relevance scoring functions in several aspects. The context relevance estimator 454, for example, does not use a fixed-length input sequence, and does not use a self-attention mechanism to compute the relevance score. Further, the context relevance estimator 454 does not use a memory scorer to aggregate the relevance scores. Instead, the context relevance estimator 454 uses a feed-forward network to compute the relevance score for each memory item. The context relevance estimator 454 can be formulated as follows:

$$s_t = f(q_t, M_t) \in \mathbb{R}^m$$

13

14 where f is a feed-forward network, and $s_t \in \mathbb{R}^m$ is the relevance vector at iteration t.

The CAMM module 405 combines the attention weights, the memory items, and the relevance scores to produce a vector representation that summarizes the most relevant information from the input. The CAMM module 405 can be formulated as:

$$c_t = \sum i = 1^m a_{t,i} s_{t,i} m_{t,i} \in \mathbb{R}^d$$

Where $c_t \in \mathbb{R}^d$ is the output vector at iteration t, $a_{t,i}$ is the attention weight for the i-th input representation at iteration t, $s_{t,i}$ is the relevance score for the i-th input representation at iteration t, and $m_{t,i}$ is the i-th memory item at iteration t.

The output decoder 407 is configured to generate a natural language response using one or more LLMs conditioned on the output of the CAMM module 405. The output decoder 407 can use any text-based LLM (e.g., BERT, GPT-3, etc.) that supports text generation. The output decoder 407 can also incorporate visual and spatial information from the AR context into the response, such as providing directions, suggestions or explanations based on the view of the user 411.

The user feedback module 409 collects and analyzes feedback from the user 411, and uses such feedback to update the CAMM module 405 and the output decoder 407. The user feedback can be explicit or implicit. Explicit feedback includes, by way of example, ratings, comments or corrections from the user 411. Implicit feedback includes, by way of example, emotions, gestures or actions from the user 411. The user feedback module 409 uses different methods to analyze different types of feedback. For example, the user feedback module 409 may use sentiment analysis to extract emotions from text or speech, facial recognition to detect emotions from images or videos, reinforcement learning to learn from rewards or penalties, etc. The user feedback module 409 may also use different methods to update different modules. For example, the user feedback module 409 may use backpropagation to update the parameters of the neural networks in the CAMM module 405 and the output decoder 407, or use meta-learning to update the initial query vector in the continuous attention mechanism 450. The user feedback module 409 aims to adapt to different user preferences in order to provide personalized and satisfying experiences for different users.

The technical solutions described herein provide various technical advantages through the novel implementation of the CAMM algorithm. The technical solutions described herein also provide various technical advantages and address technical challenges of conventional approaches. For example, the technical solutions described herein leverage LLMs to generate natural language responses while conventional approaches rely on predefined scripts or templates. Further, the technical solutions described herein enhance LLMs with CAMM to process large and diverse input texts, while conventional approaches use conventional attention mechanisms or memory networks. The technical solutions described herein are also configured to incorporate visual and spatial information from the AR context into the input and output, while conventional approaches ignore or under-utilize such information. In some embodiments, the technical solutions are able adapt to different user preferences and provide personalized and more satisfying user experiences through dynamic adjustment based on user feedback, whereas conventional approaches offer generic and static experiences.

In some embodiments, the technical solutions described herein are able to provide more realistic and engaging responses that match the user's query and the AR context. Conventional approaches, in contrast, can produce only limited and predefined responses that may not suit the user's needs or expectations. The technical solutions described herein are also able to handle various types of input, such as user utterances, dialog history, product descriptions, reviews, etc., without increasing the computational complexity or memory consumption. Conventional approaches, in contrast, can handle only fixed-length input sequences and may suffer from performance degradation or memory overflow. Through taking into account visual and spatial information in the AR environment (e.g., the user's location, orientation, gestures, facial expressions, etc.), the technical solutions described herein can generate responses that are consistent and compatible with the AR context, such as providing directions, suggestion or explanations based on the user's view. Conventional approaches are either not able to utilize such information, or generate responses that are irrelevant or inconsistent with the AR context. The technical solutions described herein can advantageously learn from user behavior and feedback to improve over time. Conventional approaches, in contrast, cannot adapt to different user preferences or provide personalized and satisfying experiences.

The technical solutions described herein provide significant technical advantages in various different use cases and application areas, including but not limited to: increasing customer or other user engagement and loyalty by providing immersive and interactive shopping or other digital experiences using AR chatbots; increasing customer or other user satisfaction and retention by providing personalized and relevant product recommendations and support using AR chatbots; increasing customer or other user conversion and revenue by providing attractive and persuasive product demonstrations and promotions using AR chatbots; reducing customer service costs and improving customer service quality by providing automated and efficient product assistance and troubleshooting using AR chatbots; etc. In some embodiments, the AR chatbot may be used to guide a customer or other user through each step of a process in real-time, with context-aware assistance that takes into account the user's actions, questions and the visual details captured by the AR technology. The AR chatbot is also configured to respond to changes in the environment or user behavior, as the CAMM model has the ability to handle long contexts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based generation of outputs in AR environments will now be described in greater detail with reference to FIGS. 5 and 6. Although described in the context of system 100, these platforms may also be used to implement at least portions of other information processing systems in other embodiments.

Figure 5:
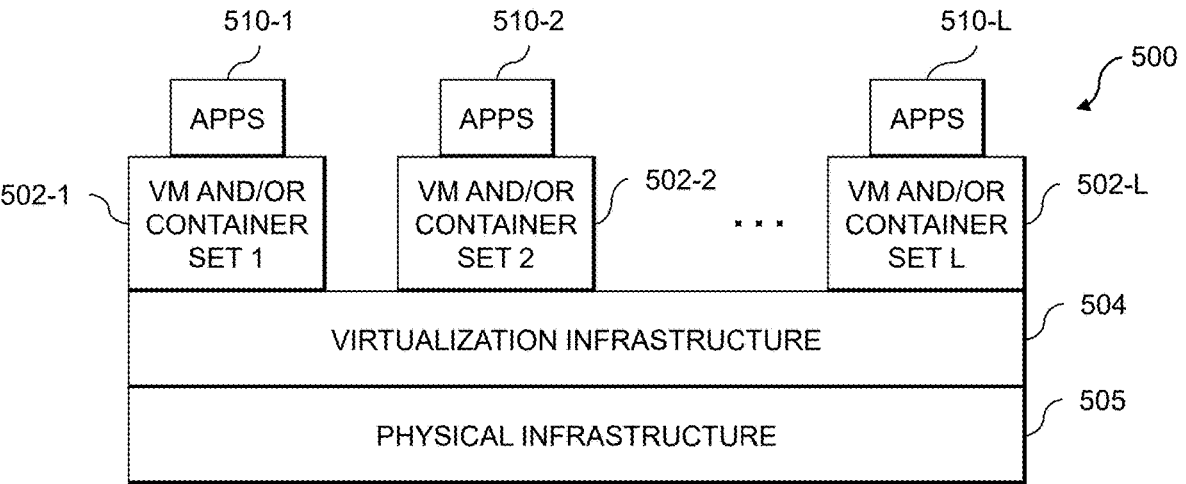
FIGS. 5 and 6 show examples of processing platforms that may be utilized to implement at least a portion of an information processing system in illustrative embodiments.
Figure 6:
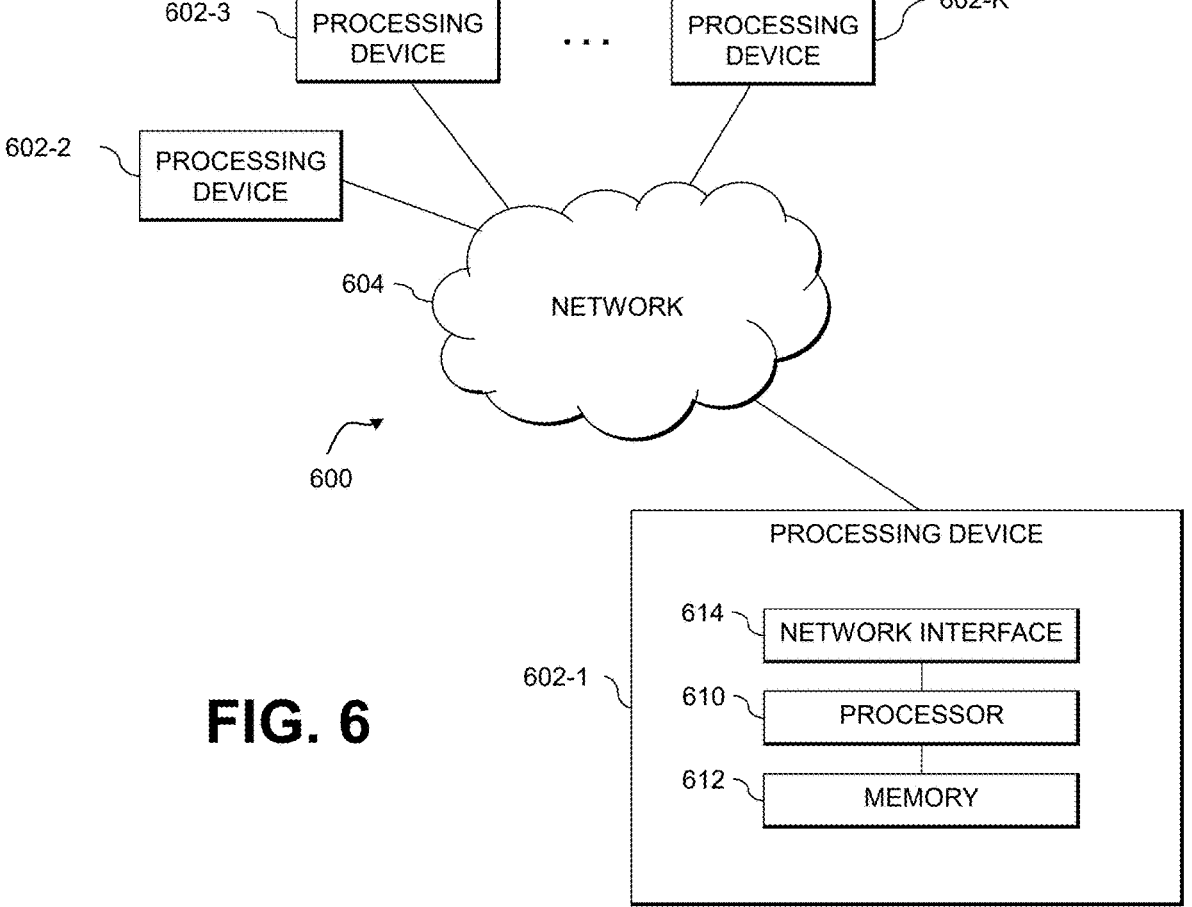

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU)

or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based generation of outputs in AR environments as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to generate, using a first machine learning model, a first data structure comprising input representations of one or more input components from an augmented reality environment;

to generate, using a second machine learning model that takes as input at least a portion of the first data structure, a second data structure comprising at least one vector representation characterizing relevance of one or more of the input representations in the first data structure;

to generate, using a third machine learning model that takes as input at least a portion of the first data structure and at least a portion of the second data structure, an output response; and to present the output response to a user in the augmented reality environment.

2. The apparatus of claim 1 wherein the one or more input components comprise:

(i) a user prompt received from the user in the augmented reality environment;

(ii) a history of interactions associated with the user in the augmented reality environment; and (iii) visual and spatial information associated with the user in the augmented reality environment.

3. The apparatus of claim 2 wherein the first machine learning model used to generate the first data structure comprises one or more large language models.

4. The apparatus of claim 3 wherein the one or more large language models comprise:

at least a first text-based large language model configured for generating input representations of the (i) the user prompt received from the user in the augmented reality environment and (ii) the history of interactions associated with the user in the augmented reality environment; and at least a second vision-based large language model configured for generating input representations of (iii) the visual and spatial information associated with the user in the augmented reality environment.

5. The apparatus of claim 1 wherein the second machine learning model comprises a Continuous Attention Memory Model (CAMM).

6. The apparatus of claim 5 wherein the CAMM comprises:

a continuous attention mechanism configured to compute attention weights between the input representations of the first data structure and a query vector;

a dynamic memory bank configured to store and update information from the input representations of the first data structure as memory items, each of the memory items comprising a vector representation encoding information from at least one of the input representations of the first data structure; and a context relevance estimator configured to rank the memory items according to a relevance to a current context of the augmented reality environment.

7. The apparatus of claim 6 wherein the query vector is initialized randomly and updated iteratively utilizing a gradient descent algorithm.

8. The apparatus of claim 6 wherein the continuous attention mechanism is configured to utilize a dot product to compute the attention weights and a sigmoid function.

9. The apparatus of claim 6 wherein the dynamic memory bank comprises a set of memory slots, each of the memory slots comprising at least one of the memory items, the dynamic memory bank having a fixed size of memory items and being configured to store the memory items in a chronological order utilizing a first-in, first-out policy for replacing memory items.

10. The apparatus of claim 6 wherein the context relevance estimator comprises a feed-forward neural network configured to compute relevance scores for the memory items in the dynamic memory bank.

11. The apparatus of claim 1 wherein the third machine learning model comprises one or more large language models conditioned on said at least a portion of the second data structure.

12. The apparatus of claim 11 wherein the one or more large language models further incorporates visual and spatial information from the augmented reality environment for customizing the output response based at least in part on a view of the user in the augmented reality environment.

13. The apparatus of claim 1 wherein the at least one processing device is further configured to update at least one of the first machine learning model, the second machine learning model and the third machine learning model according to one or more user preferences of the user in the augmented reality environment.

14. The apparatus of claim 13 wherein the one or more user preferences of the user in the augmented reality environment are determined based at least in part on at least one of:

sentiment analysis extracting emotions from text or speech of the user captured in the augmented reality environment;

facial expression recognition to detect emotions from one or more images of the user captured in the augmented reality environment; and reinforcement learning to learn from rewards or penalties determined from user interaction in the augmented reality environment.

15. A computer program product comprising a non-transitory processor-readable storage medium having stored therein program code of one or more software programs, wherein the program code when executed by at least one processing device causes the at least one processing device:

to generate, using a first machine learning model, a first data structure comprising input representations of one or more input components from an augmented reality environment;

to generate, using a second machine learning model that takes as input at least a portion of the first data structure, a second data structure comprising at least one vector representation characterizing relevance of one or more of the input representations in the first data structure;

to generate, using a third machine learning model that takes as input at least a portion of the first data structure and at least a portion of the second data structure, an output response; and to present the output response to a user in the augmented reality environment.

16. The computer program product of claim 15 wherein the one or more input components comprise:

(i) a user prompt received from the user in the augmented reality environment;

(ii) a history of interactions associated with the user in the augmented reality environment; and (iii) visual and spatial information associated with the user in the augmented reality environment.

17. The computer program product of claim 15 wherein the second machine learning model comprises a Continuous Attention Memory Model (CAMM), the CAMM comprising:

a continuous attention mechanism configured to compute attention weights between the input representations of the first data structure and a query vector;

a dynamic memory bank configured to store and update information from the input representations of the first data structure as memory items, each of the memory items comprising a vector representation encoding information from at least one of the input representations of the first data structure; and a context relevance estimator configured to rank the memory items according to a relevance to a current context of the augmented reality environment.

18. A method comprising:

generating, using a first machine learning model, a first data structure comprising input representations of one or more input components from an augmented reality environment;

generating, using a second machine learning model that takes as input at least a portion of the first data structure, a second data structure comprising at least one vector representation characterizing relevance of one or more of the input representations in the first data structure;

generating, using a third machine learning model that takes as input at least a portion of the first data structure and at least a portion of the second data structure, an output response; and presenting the output response to a user in the augmented reality environment;

wherein the method is performed by at least one processing device comprising a processor coupled to a memory.

19. The method of claim 18 wherein the one or more input components comprise:

(i) a user prompt received from the user in the augmented reality environment;

(ii) a history of interactions associated with the user in the augmented reality environment; and (iii) visual and spatial information associated with the user in the augmented reality environment.

20. The method of claim 18 wherein the second machine learning model comprises a Continuous Attention Memory Model (CAMM), the CAMM comprising:

a continuous attention mechanism configured to compute attention weights between the input representations of the first data structure and a query vector;

a dynamic memory bank configured to store and update information from the input representations of the first data structure as memory items, each of the memory items comprising a vector representation encoding information from at least one of the input representations of the first data structure; and a context relevance estimator configured to rank the memory items according to a relevance to a current context of the augmented reality environment.

* * * * *